Jan. 26, 1960 K. SOLHEIM 2,922,997

TELEVISION CHASSIS

Filed March 19, 1957 3 Sheets-Sheet 1

INVENTOR.

KARSTEN SOLHEIM,

BY Donald R. Timbie

HIS ATTORNEY.

Jan. 26, 1960    K. SOLHEIM    2,922,997

TELEVISION CHASSIS

Filed March 19, 1957    3 Sheets-Sheet 2

INVENTOR:
KARSTEN SOLHEIM,
BY Donald N. Timbie
HIS ATTORNEY.

Jan. 26, 1960 K. SOLHEIM 2,922,997

TELEVISION CHASSIS

Filed March 19, 1957 3 Sheets-Sheet 3

INVENTOR.

KARSTEN SOLHEIM,

BY Donald H. Timbie

HIS ATTORNEY.

United States Patent Office 2,922,997

Patented Jan. 26, 1960

2,922,997

TELEVISION CHASSIS

Karsten Solheim, Redwood City, Calif., assignor to General Electric Company, a corporation of New York Application March 19, 1957, Serial No. 647,063

12 Claims. (Cl. 340—367)

This invention relates to television receiver constructions and particularly to chassis therefor.

Modern television receivers include a cabinet within which is mounted a cathode ray tube and a chassis supporting the various electronic tubes and parts. It is convenient in certain constructions to mount certain of the parts and tubes on boards having so called "printed circuits" thereon. In order to provide a satisfactory electrical circuit, it is necessary that suitable electrical connection be made between the chassis, which is preferably formed of metal, and a copper strip on the board which provides ground potential connections for circuit elements mounted on the board. These connections have heretofore been made with screws or spring clips. These methods of connection are costly to make and the ground point is not always repeated from time to time during operation because of contraction and expansion of the printed board. The point of contact between the copper strips on the printed board and the screws or spring clips also become corroded whereby to impair the electrical contact therebetween.

It further is necessary to provide a shield over the circuit elements mounted on the chassis to reduce interference from external sources. These shields have heretofore been applied by screwing or soldering them over the areas to be shielded. The shields are expensive to assemble during manufacture and furthermore are inconvenient and troublesome to remove and replace during repair.

There are often several related styles and models of television receivers manufactured and sold by a given company at one time. Often substantially the same electrical circuit components can be used in two or more of these different styles and models of television receiving sets but it often has been necessary heretofore to provide a separate style of chassis for each separate style of receiving set. This has been particularly true when a different size cathode ray tube is used such as a 21 inch cathode ray picture tube and a 24 inch picture tube.

Accordingly, it is an important object of the present invention to provide an improved television receiving set construction and particularly an improved chassis therefor.

Another object of the invention is to provide an improved chassis for television receiving sets providing an improved mounting for printed boards to be used therewith, the improved mounting simplifying assembly and manufacture of the receiving set.

In connection with the foregoing object, it is another object of the invention to provide an improved chassis including an improved construction for mounting a printed board thereon wherein the mounting for the board makes improved electrical contact with the ground strips on the printed board, the ground point being reproduceable so that all receiving sets will provide uniform performance.

Still another object of the invention is to provide an improved construction for mounting printed boards on television chassis wherein the ground points between the chassis and the printed board are normally polished during operation of the receiving set whereby to maintain positive ground points.

Still another object of the invention is to provide an improved television chassis which includes an integral shield over the electrical circuit components.

In connection with the foregoing object, it is another object of the invention to provide a chassis including an integral shield of the type set forth wherein the shield is provided with holes therethrough permitting access to solder and connection points on the printed board, the holes not interfering with effective electrical shielding.

A further object of the invention is to provide an improved chassis of the type set forth which can be used with either a 21 inch picture tube or a 24 inch picture tube without adding or removing any parts.

In connection with the foregoing object, it is a still further object to provide an improved television chassis which forms a part of the bracket supporting the picture tube.

These and other objects and advantages of the invention will be better understood from the following description when taken in conjunction with the accompanying drawings. In the drawings wherein like reference numerals have been utilized to designate like parts throughout:

Figure 1:
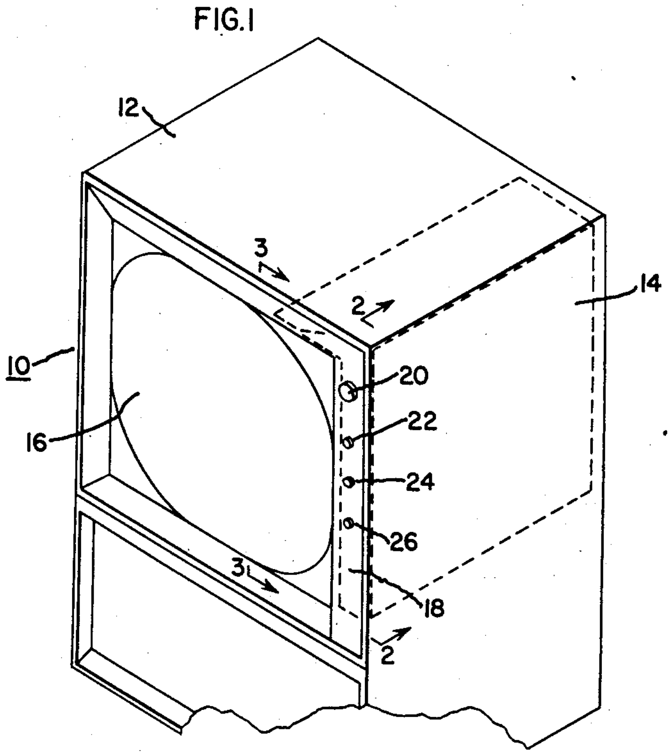
Figure 1 is a perspective view of a television receiving set made in accordance with and embodying the principles of the present invention.

Referring to Figure 1 of the drawings there is shown a television receiving set generally designed by the numeral 10 including a cabinet 12 within which are mounted a chassis 14 and a cathode ray picture tube 16. Chassis 14 is mounted along the right hand side of picture tube 16 as viewed from the front of the receiving set 10. The various operating controls for the receiver extend outwardly through the right hand section 18 of the front panel of cabinet 12 and they include for example the channel selector control 20, a combination brightness and contrast control 22, a vertical hold control 24 and an on-off-volume control 26.

Figure 2:
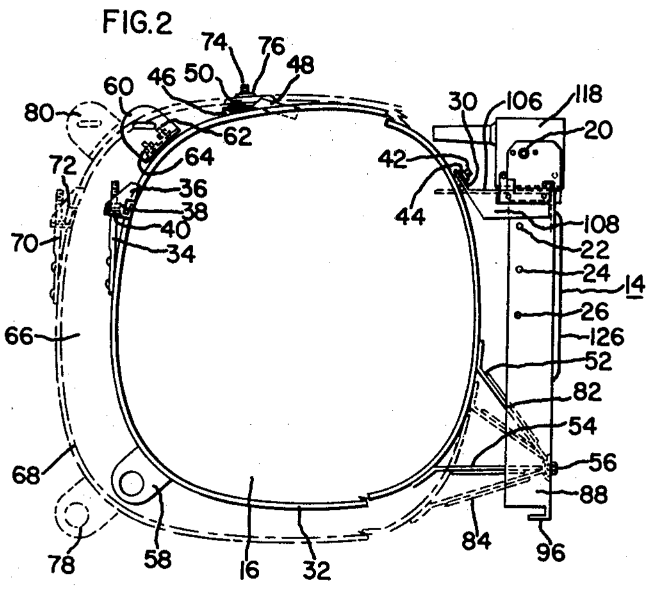
Figure 2 is a fragmentary view in vertical section of the television receiving set of Figure 1 substantially as seen in the direction of the arrows along the line 2—2 of Figure 1, a smaller size television picture tube being shown in the mounted position in solid lines and a larger size picture tube being shown in mounted position in dotted lines.

As may be best seen in Figure 2 of the drawings, the chassis 14 forms a part of the bracket for supporting the picture tube 16, a smaller picture tube being shown in solid lines and a larger picture tube assembly in dotted lines. More specifically there is formed on chassis 14 an outstanding flange disposed substantially horizontally and terminating in an upturned flange 30. Extending around the greatest diameter of the smaller picture tube 16 is a strap 32. Strap 32 completely encircles picture tube 16 and is provided on one end with a threaded stud 34 and on the other end with an L-shaped bracket 36 having an aperture therein to receive the threaded end of stud 34. A nut 38 and a lock washer 40 interconnect stud 34 and bracket 36 to clamp band 32 about picture tube 16.

Figure 3:
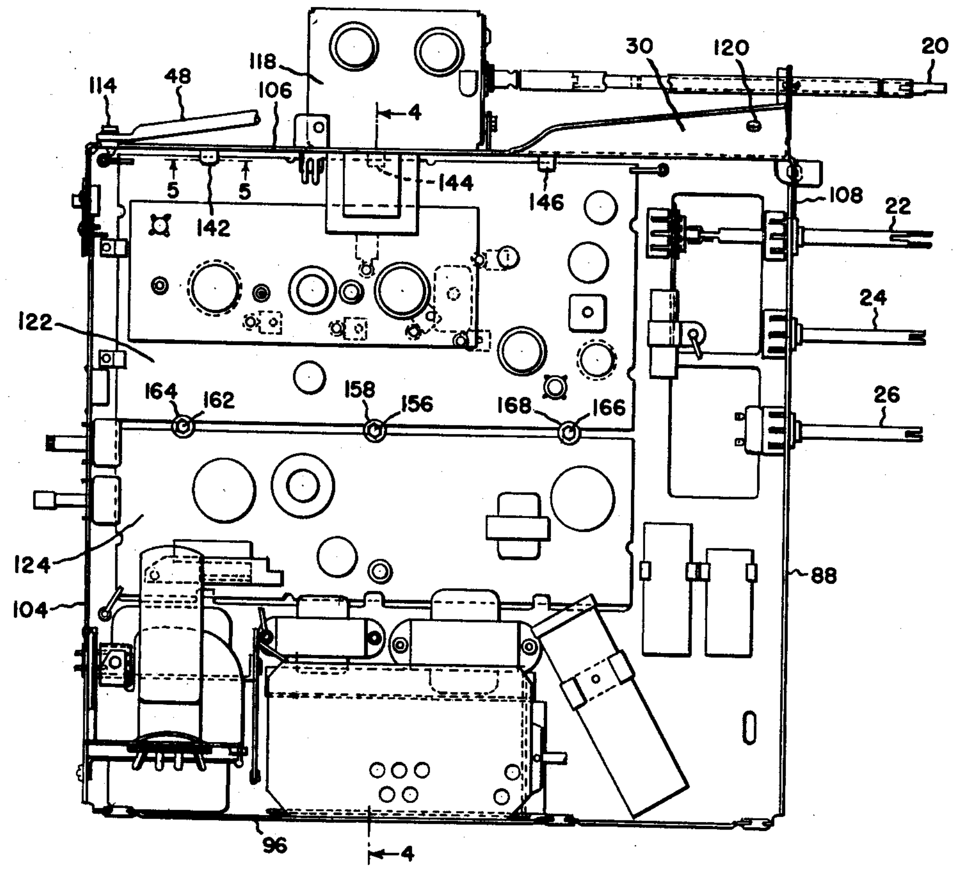
Figure 3 is a partial view in vertical section through the television receiver of Figure 1 substantially as seen in the direction of the arrows along the line 3—3 of Figure 1.

Extending outwardly from band 32 is a first stud 42 passing through an aperture in flange 30. A washer and nut 44 engage the threaded end of stud 42 to clamp band 32 to flange 30. Another threaded stud 46 extends outwardly from band 32 and is received in an aperture formed in the end of a rod 48. A washer and nut assembly 50 interconnect stud 46 and rod 48. The other end of rod 48 is attached to chassis 14 (see Figure 3).

Another point of attachment of band 32 to chassis 14 is provided by a pair of arms 52 and 54 which are suitably attached as by welding to band 32 at one end and are secured to chassis 14 as by a bolt 56. A first hanger bracket 58 is provided on the lower left hand portion of band 32 for attachment to a point on the cabinet 12. A second hanger bracket 60 is attached to band 32 by a pair of threaded studs 62 mounted thereon and passing through apertures in bracket 60, washers and nuts 64 holding bracket 60 on studs 62. It will be seen from the above description that chassis 14 forms an important part of the support for picture tube 16.

There is illustrated in dotted lines the manner in which chassis 14 can be used also to mount a 24 inch picture tube generally designated by the numeral 66. Encircling tube 66 at the greatest diameter thereof is a band 68 similar to band 32 but substantially greater in diameter. One end of band 68 is provided with a threaded stud 70 and the other end is provided with a bracket 72 having an aperture to receive the threaded end of stud 70. A nut and washer interconnect stud 70 and bracket 72. Extending outwardly from band 68 is a first stud which is positioned identical with stud 42 described above and is connected to flange 30. A second stud 74 extends outwardly from band 32 and engages a support rod 76 similar in construction to support rod 48. A pair of hanger brackets 78 and 80 is also provided. Attached to the lower right hand side of band 68 is a pair of arms 82 and 84 which are attached to chassis 14 by means of a bolt such as bolt 56 described above. Band 68 and the associated parts cooperate with chassis 14 to mount a 24 inch television picture tube 66 on chassis 14 without any change in the construction of chassis 14. This mounting of a larger picture tube is accomplished without adding or removing any parts, the various connecting parts being identical in construction although different in size in certain instances.

Figure 6:
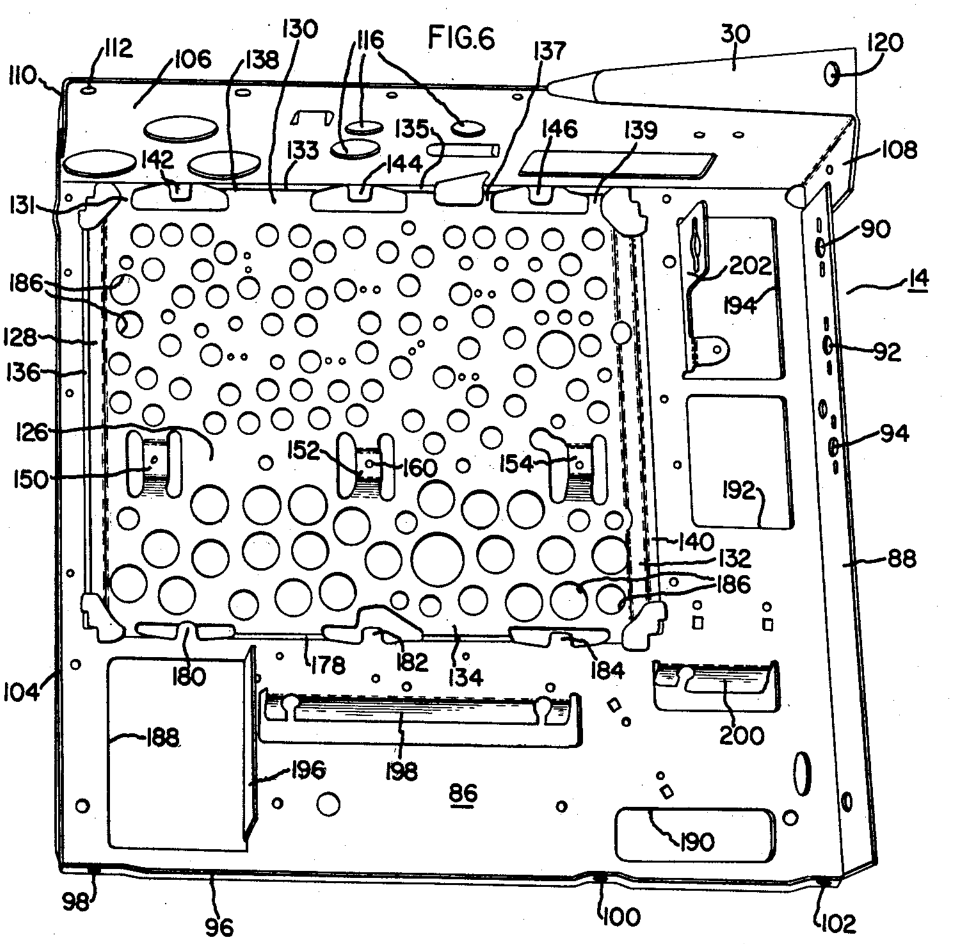
Figure 6 is a perspective view of a television chassis made in accordance with and embodying the principles of the present invention.

Referring particularly to Figure 6 of the drawings, the details of construction of the chassis 14 will be described. Preferably chassis 14 is formed from a single sheet of electrically conductive metal such as steel which is zinc plated. The steel plate is suitably cut, drilled and shaped to the form shown in Figure 6 and thereafter certain overlying parts secured together as by spot welding. The fully formed chassis 14 includes a substantially flat base 86 which is generally rectangular in shape. As may be best seen in Figure 2 of the drawings base 86 is normally disposed vertically when installed and extends from front to rear of the assembled television receiver 16, base 86 being disposed along the right hand side of cabinet 12.

Formed integral with base 86 and extending substantially perpendicular thereto is a front flange 88. Front flange 88 is provided with 3 spaced apart sets of apertures 90, 92 and 94 through which to receive the control shafts for the brightness and contrast control 22, the vertical hold control 24 and the On-Off-volume control 26.

A bottom flange 96 is provided along another edge of base 86 and extends substantially perpendicular thereto. A plurality of apertures 98, 100 and 102 is provided therein to aid in mounting chassis 14 within cabinet 12. A vertically extending rear flange 104 is provided along the rear edge of base 86 and extends substantially the entire length thereof.

Formed along the upper edge of base 86 is a top flange 106 extending substantially perpendicular to the plane of base 86. The front edge of top flange 106 is provided with a short downturned flange 108 which is secured to front flange 88 as by spot welding. A downwardly directed flange 110 is provided along the rear edge of top flange 106, flange 110 being secured to rear flange 104 by spot welding. Formed near the rear edge of top flange 106 is an aperture 112 which is adapted to receive a bolt 114 that connects rod 48 to chassis 14. Other apertures 116 are provided in flange 106 to mount and receive a tuner unit 118 that is supported by flange 106 (see Figures 2 and 3 also). The forward free edge of flange 106 is turned upwardly away from base 86 and at an acute angle therewith to provide the flange 30 having an aperture 120 therein which receives the stud 42 to connect band 32 to chassis 14.

A large number of the circuit elements including high vacuum thermionic tubes, capacitances, resistances and inductances are mounted upon a pair of printed boards 122 and 124 which are in turn mounted on chassis 14. Boards 122 and 124 are preferably made of an electrical insulating plastic such as a phenol formaldehyde plastic and have applied thereto so called "printed circuits." The printed circuits comprise a thin layer of copper which is deposited upon the plastic base. An important feature of the present invention lies in the mounting of the printed circuit boards 122 and 124 upon chassis 14 and the shielding of the circuits on the boards by portions of chassis 14.

Referring again to Figure 6 of the drawings, it will be seen that a rather large portion of base 86 has been deformed from the plane thereof downwardly as viewed in Figure 6 to provide a pan 126. Pan 126 is generally rectangular in shape and is disposed toward the upper rear corner of base 86. The plane of pan 126 is disposed outwardly and to the right away from base 86 as viewed in Figure 2 of the drawings. Pan 126 is attached to base 86 by four flanges 128, 130, 132 and 134 which are inclined at an acute angle with respect to both base 86 and pan 126. These flanges converge toward each other toward the center of pan 126. Printed boards 122 and 124 are adapted to overlie and be supported above pan 126. More specifically printed board 122 is supported upon a series of ledges 136, 138 and 140 disposed about the periphery of pan 126 and disposed in a plane lying between the planes of base 86 and pan 126. Ledge 138 and the associated flange 130 are broken into five sections by cut-outs to provide five ledge sections 131, 133, 135, 137 and 139. Overlying the plane of ledge 138 are three resilient fingers 142, 144 and 146, these fingers terminating in upturned lips such as lip 148 on finger 144 (see Figure 4) and being disposed between ledge sections.

The fourth edge of printed board 122 is supported upon three U-shaped support members 150, 152 and 154 deformed upwardly from the plane of pan 126 as viewed in Figure 6 and having the upper surfaces thereof lying in the same plane as ledges 136, 138 and 140.

Figure 4:
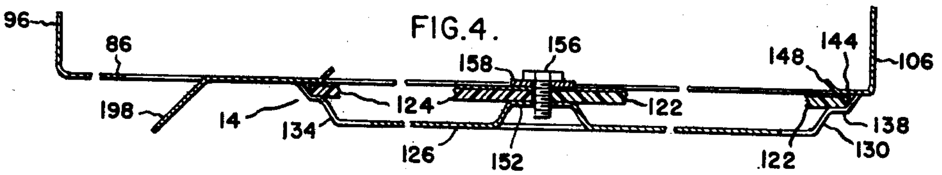
Figure 4 is an enlarged view with certain parts broken away in vertical section through the chassis of Figure 3 substantially as seen in the direction of the arrows along the line 4—4 of Figure 3 and illustrating particularly the mounting of the printed boards on the chassis.

The manner in which board 122 is mounted upon chassis 14 is best shown in Figure 4 of the drawings. One edge of board 122 is positioned upon ledge 138 and is held thereagainst by the fingers 142—144—146 (finger 144 only being shown in Figure 4). The shorter parallel edges of board 122 are supported upon ledges 136 and 140. The fourth edge of board 122 is disposed upon support members 150—152—154 (only support member 152 being shown in Figure 4). A threaded stud 156 in cooperation with a washer 158 serves to hold board 122 against support member 152, stud 156 engaging an aperture 160 in support member 152. A similar stud 162 and washer 164 holds board 122 against support member 150 and a stud 166 and washer 168 hold board 122 against support member 154. In assembling board 122 on chassis 14, board 122 has the edge thereof to be disposed toward top flange 106 pushed along ledges 136 and 140 until it is positioned upon ledge 138. The edge of board 122 is guided under fingers 142—144—146 by the lips thereon such as lip 148 on finger 144. After the board 122 is in proper position, bolts 156—162—166 are put into position. Board 122 is now firmly mounted upon chassis 14.

Figure 5:
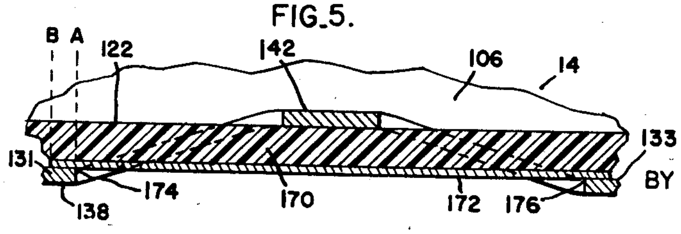
Figure 5 is a fragmentary enlarged view in section substantially as seen in the direction of the arrows along the line 5—5 of Figure 3 and illustrating the ground connection between a television chassis and a printed board.

The way in which electrical contact is made between chassis 14 and the ground strips on board 122 is best illustrated in Figure 5 of the drawings. As has been explained above board 122 includes a plastic body 170 on which is placed a conducting ground strip 172. Ground strip 172 bears against support ledge 138 and particularly at the edges of ledge sections 131, 133, 135, 137 and 139 such as at the two spaced apart points 174 and 176 on ledge sections 131 and 133, respectively, on either side of finger 142. Ten such ground points are provided between printed board 122 and chassis 14.

When television receiving set 10 is turned on, the heat of operation thereof tends to cause printed board 122 to expand. Expansion of board 122 causes the ground points between ground strip 172 and chassis 14 to shift. For example, ground point 174 may shift from the position marked A in Figure 5 to that marked B. Upon cooling, ground strip 172 will again move to return point 174 to point A. This relative movement between board 122 and chassis 14 serves to polish the ground points therebetween whereby to insure good electrical contact thus maintaining positive ground points.

By making the ground points between ground strip 172 and chassis 14 dependent upon the shape of chassis 14, the position of the ground points can be readily reproduced from one receiving set to the next. More particularly the precise location of the ground points is repeated in successive receiving sets and these ground points are positioned to provide a proper electrical ground. All television sets made with this form of chassis therefore will provide uniform performance.

Printed board 124 is mounted upon chassis 14 in a manner similar to printed board 122. The shorter parallel ends of printed board 124 are supported upon chassis 14 by ledges 136 and 140. One of the longer parallel edges of board 124 is supported upon support members 150, 152 and 154 and is held in position thereon by the bolts 156, 162 and 166. The other longer edge of board 124 is supported upon a ledge 178 formed adjacent flange 134, ledge 178 being formed in sections in a manner similar to ledge 138 described above. A plurality of resilient fingers 180, 182 and 184 extend outwardly over the plane of ledge 178 to clamp board 124 thereagainst. Fingers 180—182—184 are formed in shape similar to finger 144 described above and more specifically are provided with lips on the outer ends thereof directed away from plane of ledge 178.

During assembly of the parts on chassis 14 board 124 is pushed under fingers 180—182—184 and seated upon ledges 136, 140 and 178 as well as support members 150—152—154. After both printed boards 122 and 124 have been placed in proper position, the bolts 156—162—166 are fastened to chassis 14 whereby to clamp printed boards 122 and 124 in the assembled position.

The ground strip on board 124 makes a good contact with chassis 14 and particularly along ledge 178 in a manner similar to that described above with respect to board 122. The ground points are readily reproduceable from one set to another whereby to maintain the same operating characteristics in individual receiver sets and the contact points are further polished by the expansion and relative movement of chassis 14 and board 124.

Pan 126 further serves as an electrical shield to shield the printed board and the circuits mounted thereon from outside interferences. By using pan 126 as an electrical shield, the need for mounting separate shield members as by screwing or soldering is eliminated. In order to provide ready access to connections and solder points for electrical components mounted upon boards 122 and 124, a plurality of holes 186 is provided in pan 126. The holes 186 permit ready access to the solder points to permit repair and replacement of parts yet these holes are sufficiently small that pan 126 is still effective as an electrical shield. Accordingly, repair and maintenance can be carried on without the need for a removable electrical shield. This results in large cost savings in manufacture and also simplifies replacement and repair of parts on the printed boards.

Chassis 14 is further provided with the usual apertures and flanges such as apertures 188, 190, 192 and 194 and flanges 196, 198, 200 and 202 to mount other circuit components needed to complete the television receiving set.

It will be seen that there has been provided an improved chassis and an improved mounting for printed boards on the chassis which fulfills all of the objects and advantages set forth above. Although a preferred form of the invention has been shown for purposes of illustration, it is to be understood that various changes and modifications can be made therein without departing from the spirit and scope of the invention. Accordingly, the invention is to be limited only as set forth in the following claims.

What I claim as new and desire to secure by Letters Patent of the United States is:

1. In a television receiving set, a chassis formed of an electrical conducting material and comprising a base having the major portion thereof lying in a plane, a pan formed integral with said base and lying in a plane spaced from the plane of said base, a plurality of the flanges interconnecting said base and said pan, and means to mount a printed board over said pan with at least a portion of the components on the printed board lying between the planes of said base and said pan, said pan forming an electrical shield for the components on the printed board.

2. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, printed board support ledges formed on said flanges and lying in a common plane disposed between the planes of said base and said pan, and means resiliently to hold a printed board on said ledges, said pan forming an electrical shield for components on the printed board.

3. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, a plurality of printed board support ledges formed on said flanges and lying in a common plane disposed between the planes of said base and said pan, and a plurality of resilient fingers formed integral with said base and overlying said ledges in position to hold a printed board on said ledges, said pan forming an electrical shield for components mounted on the printed board.

4. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, a printed board having an electrical conducting ground strip thereon mounted over said pan, and means formed integral with said chassis making contact with said ground strip to provide an electrical connection between said ground strip and said chassis.

5. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, a plurality of ledges formed on said flanges and disposed in a common plane lying between the planes of said base and said pan, a printed board having an electrical conducting ground strip thereon mounted on said ledges, means to hold said printed board on said ledges, and means formed integral with said chassis contacting said ground strip to provide an electrical contact therewith.

6. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, a plurality of ledges formed on said flanges and disposed in a common plane lying between the planes of said base and said pan, a printed board having an electrical conducting ground strip thereon mounted on said ledges, and a plurality of fingers formed integral with said base and overlying said printed board to hold said printed board against said ledges, said ledges making electrical contact with said ground strip.

7. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, a plurality of ledges formed on said flanges and disposed in a common plane lying between the planes of said base and said pan, a printed board having an electrical conducting ground strip thereon mounted on said ledges, a plurality of fingers formed integral with said base and overlying said printed board to hold said printed board against said ledges, a plurality of support members formed integral with said pan and having support portions lying in the same plane as said ledges and underlying said printed board, and fastener members engaging said support members and said printed board to hold said printed board in position on said support members and said ledges, said ledges making electrical contact with said ground strip.

8. In a television receiving set, a chassis formed of an electrical conducting material and comprising a base having the major portion thereof lying in a plane, a pan formed integral with said base and lying in a plane spaced from the plane of said base, a plurality of flanges interconnecting said base and said pan, a plurality of ledges formed on said flanges and disposed in a common plane lying between the planes of said base and said pan, a plurality of support members formed integral with said pan and having support portions lying in the common plane of said ledges, a pair of printed boards having ground strips formed thereon mounted upon said ledges and said support members, a first group of resilient fingers formed integral with said base and overlying one edge of one of said printed boards to press the printed board against the adjacent ledge, a second group of resilient fingers overlying one edge of the other of said boards and urging said other printed board against the adjacent ledge, and a plurality of fastening members engaging said support members and said printed boards to hold said printed boards in operative position, the ledges adjacent said fingers engaging and making electrical contact with the ground strip on the associated printed boards.

9. In a television receiving set, a chassis formed of an electrical conducting material and comprising a base having a major portion thereof lying in a plane, a pan formed integral with said base and lying in a plane spaced from the plane of said base, a plurality of flanges interconnecting said base and said pan, a printed board having an electrical conducting ground strip thereon mounted over said pan with at least a portion of the components on the printed board lying between the planes of said base and said pan, said pan forming an electrical shield for the components on the printed board, and means formed integral with said chassis making contact with said ground strip to provide an electrical connection between said ground strip and said chassis.

10. In a television receiving set, a chassis formed of an electrical conducting material and comprising a base having a major portion thereof lying in a plane, a plane formed integral with said base and lying in a plane spaced from the plane of said base, a plurality of flanges interconnecting said base and said pan, printed board support ledges formed on said flanges lying in a common plane disposed between the planes of said base and said pan, a printed board having an electrical conducting ground strip thereon mounted on said ledges over said pan with at least a portion of the components on said printed board lying between the planes of said base and said pan, and resilient fingers formed on said chassis and overlying said ledges to hold said printed board in position, said pan providing an electrical shield for the components on said printed board, portions of said ledges contacting said ground strip to provide an electrical connection between said ground strip and said chassis.

11. In a television receiving set, the combination comprising a chassis having a base with the major portions thereof lying in a plane, a flange formed on one edge of said base and extending substantially perpendicular to the plane thereof, an adjustable band adapted to encircle and engage a television receiving tube at the largest dimension thereof, first attachment means interconnecting said band and said flange at a first point to support said band in a position substantially perpendicular to the plate of said base, an arm interconnecting said band and said chassis at a point spaced from said flange, and a support rod interconnecting said flange and a point on said band spaced from said first point.

12. In a television receiving set, a substantially rectangular chassis formed of an electrical conducting material and comprising a base having the major portion thereof lying in a plane, a flange formed on each of the four edges of said chassis and extending substantially perpendicular to the plane of said base and in the same direction from said base, a television picture tube support band mounting means formed on one of said flanges, a pan formed integral with said base and lying in a plane substantially parallel to the plane of said base and spaced therefrom in a direction opposite to said flanges, a plurality of pan flanges interconnecting said base and said pan, a plurality of printed board support ledges formed on said pan flanges and lying in a common plane disposed between the planes of said base and said pan, a plurality of resilient fingers formed integral with said base and overlying said ledges in position to hold a printed board on said ledges, said pan forming an electrical shield for components mounted on a printed board positioned thereover, said pan having a plurality of apertures therein to provide access to connecting points for components on an associated printed board, and a plurality of support members formed integral with said pan and extending therefrom in a direction toward said ledges and including support portions lying in the common plane of said ledges to support a printed board thereon.

References Cited in the file of this patent

UNITED STATES PATENTS

| | | |
|---|---|---|
| 2,738,501 | Swanson | Mar. 13, 1956 |
| 2,798,897 | Bang | July 9, 1957 |
| 2,827,507 | Anderson | Mar. 18, 1958 |

OTHER REFERENCES

Electronic Equipment, December 1954, page 3.